Jan. 1, 1929.
J. A. CARR
BEARING
Filed Nov. 12, 1927
1,697,632
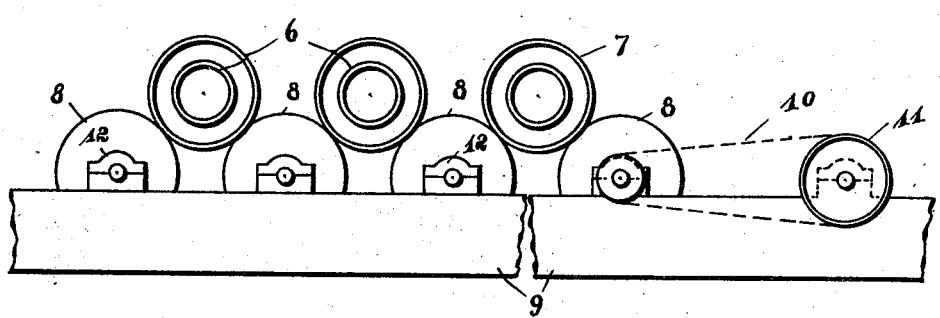
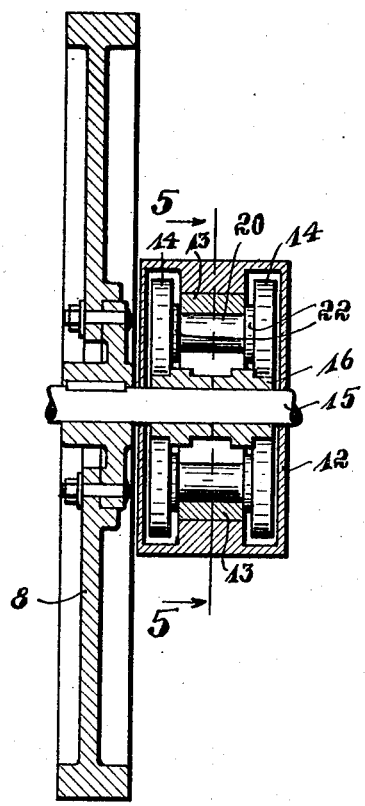
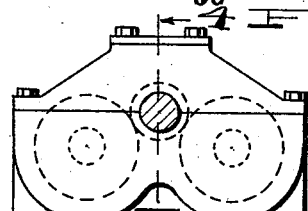
INVENTOR:
JOHN A. CARR, Patented Jan. 1, 1929.

1,697,632

UNITED STATES PATENT OFFICE.

JOHN A. CARR, OF LOS ANGELES, CALIFORNIA, ASSIGNOR TO WESTERN CONCRETE PIPE COMPANY, OF LOS ANGELES, CALIFORNIA.

BEARING.

Application filed November 12, 1927. Serial No. 232,852.

This invention relates to devices used for turnably supporting shafts and the like, as in journal boxes.

One of the objects of this invention is to reduce the friction in a journal box to a minimum.

Another object is to provide a roller in a journal box with a carrying portion of larger diameter than the carried portion.

Another object is to provide rollers spaced from one another and disposed so that a shaft or the like member can be supported between oppositely disposed rollers, so as to rest equally on and between the oppositely disposed rollers.

Another object is to provide supporting blocks for the rollers with the supporting surface slanting at about right angles to the direction of support for a shaft or the like member between oppositely disposed rollers.

Another object is to provide a yielding support below the bearing box.

Other objects will appear from the following description and appended claims as well as from the accompanying drawing, in which—

Fig. 1 is a somewhat diagrammatic illustration of an arrangement by which concrete pipes are supported on rollers while the concrete mixture may be fed into the rotating molds supported by the rollers, indicating also the position of bearings or journal boxes on a frame structure to support the rollers on which the molds for the concrete pipes rest to be rotated.

Fig. 2 is a fragmentary detail cross section through a supporting roller and journal box with rollers and supporting blocks designed to illustrate the invention.

Fig. 3 is a side elevation of the journal box of Fig. 2.

Fig. 4 is a cross section on line 4—4 of Fig. 3.

Fig. 5 is a longitudinal section on line 5—5 of Fig. 2.

Concrete pipes are efficiently poured and manufactured under centrifugal principles in the manner roughly outlined in Fig. 1.

The molds 6 are provided with rims 7 to be supported on rotating wheels 8.

Molds of this sort can be supported in a number according to the number of wheels mounted on a common frame 9.

Wheels 8 are provided on the opposite sides of the frame structure 9 so as to support the opposite ends of the molds 6.

Providing four pairs of wheels 8 allows a placing of three molds as illustrated in Fig. 1; or, providing five pairs of wheels 8, four molds may be supported; and accordingly more or less molds may be supported depending on the number of wheels provided on a common frame.

One pair of the whole set of wheels in a common frame is provided with driving means, as by a belt 10 and motor 11 roughly indicated and outlined in the drawing. However, other driving means may be provided to suit the conditions of a plant where such structures are used and depending upon requirements and various conditions of different localities and the purposes for which such structures may be used.

For concrete pipes it is sufficient to drive one pair of wheels whereby, when a mold 6 is placed in a position as illustrated in Fig. 1, the next following pair is automatically caused to rotate and thereby serves to transmit rotating motions to rotate the several concrete molds placed on the several pairs of wheels in a manner illustrated in Fig. 1.

It is not necessary that the first or any other of the following pairs of wheels are interconnected by a common shaft since any mold placed on top of the wheels 8 tends to serve as a driving force or interconnecting means between the wheels on the opposite ends of the mold. The driving of one of the wheels on one side of the whole structure is therefore sufficient as a driving means for the whole multitude of wheels otherwise absolutely unconnected.

Each of the wheels 8 is therefore preferably mounted adjacent to a journal box. A journal box as indicated at 12 is illustrated more fully detailed in Figs. 2, 3, 4, and 5. The box serves to enclose blocks 13 and the rollers 14.

A shaft 15 is provided to support the wheel 8. The shaft 15 extends therefore from the wheel 8 into and through the adjacent journal box. The shaft 15 is provided with collars 16. The collars are provided with annular shoulders 17 by which the shaft and thereby the wheel 8 is maintained in its position axially.

In providing the collars 16 with the double annular end faces or shoulders 17, these collars are made exchangeably to assure durability and satisfactory running on the rollers 14.

While the running portions 18 are shown to rest on the rollers, as especially illustrated in Fig. 4, the collars can be turned around on the shaft 15 so that the running faces 19 of the two collars come to rest on the rollers 14.

A roller 14 consists of the central supported portion 20 and the two flange-like or wheel-like end supporting portions 21. The central portion 20 serves to carry and support the end portions 21 and is therefore mounted in a trunnion box 13. The end portions 21 are spaced on all sides within the journal box 12, and a special collar portion 22 is provided to bear against the opposite sides of the block 13 as illustrated in Fig. 4.

The larger diameter of the end portions 21 in relation to the smaller diameter of the trunnion or central portion 20 provide for an easy turning of these rollers by reducing the friction on account of the small bearing surface on the comparatively small trunnion or central portion 20 for the larger roller wheels or end portions 14.

The blocks 13 are held adjustably and exchangeably within the box 12. A shoe or top block 25 serves to rest on the top of the collars 16 between the oppositely disposed faces 17 of the collars 16 on the shaft 15.

This shoe 25 is disposed in the cover plate 26 having a pin 27 by which the shoe may adjust and align itself into proper position over the shaft 15 between the two collars 16.

The whole journal box is mounted swingably and pivotally on a supporting block 28. This supporting block is provided with inclined faces 29 serving to allow a slight tilting of the whole journal box whereby the journal box may allow an aligning of the shaft 15 in a vertical plane in relation to other cooperatively disposed journal boxes.

A bolt 30 is disposed through the bottom of the journal box and through the supporting block 28 by which the journal box is pivotally held to align itself in a horizontal plane in relation to other cooperating journal boxes.

The supporting block 28 is provided with a round boss 31 around which the whole structure may swivel.

Each block 13 is of somewhat triangular form with the bottom face 32 to support the block, a comparatively large end face 33 and another comparatively small end face 34 for holding the block against endwise movements, and an inclined face 35 with a semicircular recess serving as a bearing for the central or trunnion portion 20 of a roller.

Oppositely disposed blocks 13 are therefore disposed with their inclined faces and bearing recesses in opposite directions to receive and hold the shaft 15 and thereby counteracting the pressure from the shaft to be sustained from the opposite ends of a journal box of this type.

Having thus described my invention, I claim:

1. In a journal box, a housing, trunnion blocks exchangeably disposed in the housing at opposite ends of the housing and having each a bearing portion with an axis in a horizontal plane in an inclined face of the blocks, the inclined surfaces of the oppositely disposed blocks being disposed to face centrally in relation to the housing, the said trunnion blocks having squarely shaped surfaces on the remaining sides by which the blocks can be exchangeably fitted to bring the inclined surfaces with the bearing portions into accurate operative relation to one another and rollers disposed in said bearing portions of said blocks and removable from said inclined faces of the blocks.

2. In a journal box, a housing having a hole in a vertical direction through the bottom to receive a bolt around which the housing may swivel, the housing having a rectangular recess in the bottom side crosswise to said hole to receive a guide block by which the journal box can be slidingly supported for sliding movements in a horizontal plane.

3. In a journal box, a supporting block of rectangular outline in a horizontal plane having a hole in a vertical plane to receive a bolt around which the block may swivel, and a round boss projecting from the underside of the block concentrically with said hole furnishing additional guiding means for the swiveling movements of the block.

4. In a journal box, a supporting block of rectangular outline in a horizontal plane having a hole in a vertical plane to receive a bolt around which the block may swivel, and a round boss projecting from the underside of the block concentrically with said hole furnishing additional guiding means for the swiveling movements of the block, the top of the block being inclined from the center downwardly towards the opposite ends in the direction of the longer axis of the rectangular block.

In testimony that I claim the foregoing as my invention I have signed my name.

JOHN A. CARR.